United States Patent Office 3,836,512
Patented Sept. 17, 1974

3,836,512
COPOLYMERIZATION OF OLEFINICALLY UNSATURATED MONOMERS
Nan S. Chu, Hartsdale, N.Y., assignor to Union Carbide Corporation, New York, N.Y.
No Drawing. Continuation-in-part of abandoned application Ser. No. 82,843, Oct. 21, 1970. This application Aug. 15, 1972, Ser. No. 280,882
Int. Cl. C08f 1/62
U.S. Cl. 260—80.73      8 Claims

ABSTRACT OF THE DISCLOSURE

Homogeneous copolymerization of water soluble and water insoluble olefinically unsaturated monomers has been effected by their aqueous polymerization in the presence of a dispersing agent, a redox catalyst system, a liquid hydrocarbon, an emulsifier and optionally a crosslinking agent and electrolyte.

---

This is a continuation-in-part of Ser. No. 82,843 filed on Oct. 21, 1970, now abandoned.

BACKGROUND OF THE INVENTION

This invention pertains to the preparation of homogeneous copolymers of water soluble and water insoluble monomers in an aqueous system.

The use of an aqueous system for the polymerization of monomers has long been recognized as a desirable one because of the facility with which polymerization temperatures may be regulated and because of the non-toxicity of water continuous phase. Difficulties arise however, when two monomers are copolymerized one of which is water soluble and one of which is water insoluble because the latter monomer forms a second insoluble phase during the polymerization process resulting in a non-homogeneous product. For example, the resultant polymer may actually be a mixture of homopolymers or homopolymers and copolymer. Furthermore, it is difficult to maintain reproducible polymerization systems and the nature of the product may vary from batch to batch. In addition, the distribution of monomers along the polymer chain may also vary radically which is a form of heterogeneity.

Another pitfall inherent in the use of such a polymerization system is the formation of aggregated gels produced by the aqueous solution homopolymerization of the water soluble monomer. Such a copolymer is difficult to isolate from the polymerization system, it being preferred to obtain a copolyer in a form of a workable, fine granular solid.

SUMMARY OF THE INVENTION

It has now been discovered that homogeneous copolymers of water soluble and water insoluble olefinically unsaturated monomers can be prepared by a process which comprises:

(A) heating a mixture of
  (1) a water soluble olefinically unsaturated monomer having the formula:

$$CH_2=CR'$$

wherein R is a monovalent radical selected from the group consisting of H or $CH_3$ and R' is a monovalent radical selected from the group consisting of $-CO_2H$, $-CO_2NH_2$, or $$CO_2(CH_2)_nN^+R''R'''R''''$$

wherein $n$ is an integer having a value of about 1 about 6 and each R'', R''', and R'''' is a lower alkyl group;

(2) about 16 to 50 mole percent, based on the moles of monomer (1), of a water insoluble olefinically unsaturated monomer having the formula:

$$CH=CRR_1$$

wherein R is as defined above and $R_1$ is a monovalent radical selected from the group consisting of $-CO_2R_2$, $-OCOCH_3$, halogen, $-CN$, phenyl, or $-OR_2$ wherein $R_2$ is a lower alkyl group;
  (3) 0 to about 2.0 mole percent, based on the moles of monomer (1), of a crosslinking agent selected from the group consisting of methylene bisacrylamide, lower alkylene glycol acrylates, lower alkylene glycol methacrylates or divinyl benzene;
  (4) a polymer dispersing amount of a dispersing agent;
  (5) 0 to about 10 mole percent, based on the moles of monomer (1), of an electrolyte;
  (6) about 95 to 98 mole percent, based on the moles of monomer (1), of water;
  (7) about 55 to 85 mole percent, based on the moles of monomer (2), of a normally liquid hydrocarbon free of olefinic unsaturation and having about 5 to 12 carbon atoms;
  (8) about 1.0 to 5.0 mole percent, based on the moles of hydrocarbon (7) of an emulsifier; and
  (9) a polymerizing amount of a redox catalyst, at a temperature of about 0° to 80° C. for at least 10 minutes; and
(B) recovering normally solid homogeneous copolymer.

DESCRIPTION OF THE INVENTION

Exemplary of the water soluble monomers which can be used in the practice of this invention are alpha, beta-olefinically unsaturated carboxylic acids such as acrylic acid and methacrylic acid; derivatives of said unsaturated acids, such as, acrylamide, methacrylamide, quaternary salts of dialkyl amino alkylene acrylates or methacrylates, as for example, trimethylamino ethyl acrylate or methacrylate salts; vinyl pyridines such as 4-vinyl pyridine, 2-vinyl pyridine, 2-methyl-5-vinyl pyridine and the like; and epoxy derivatives of acrylic or methacrylic acids such as for example, 2-hydroxy-3-methacryloyloxypropyl-trimethyl ammonium chloride and the like.

Exemplary water insoluble olefinically unsaturated monomers include lower alkyl esters of acrylic or methacrylic acid such as methyl acrylate, ethyl acrylate, butyl acrylate, methyl methacrylate, ethyl methacrylate, n-propyl methacrylate, and the like; unsaturated nitriles such as acrylonitriles, methacrylonitrile, and the like; aromatic substituted olefins such as styrene, vinyl pyrrolidone, and the like; aliphatic acid esters of vinyl alcohol, such as vinyl formate, vinyl acetate, vinyl propionate, and the like; and vinyl alkyl ethers, such as, vinyl methyl ether, vinyl ethyl ether, vinyl butyl ether, vinyl isobutyl ether, and the like.

While one can use a ratio of about 50 to 84 moles of water soluble olefinically unsaturated monomer to about 50 to 16 moles of water insoluble olefinically unsaturated monomer, it is preferred to use a ratio of about 60 to 80 of the former to about 40 to 20 moles of the latter.

Any reduction-oxidation (redox) catalyst system commonly used for the addition polymerization of vinyl and other olefinically unsaturated monomers can be used in the practice of this invention. Representative systems include ferrous ammonium sulfate-ammonium persulfate, potassium bisulfate-potassium persulfate, ferrous ammonium sulfate-hydrogen peroxide systems and the like. The catalyst concentration can range from about 0.01 to 0.5 mole percent, based on the total number of moles of both water soluble and water insoluble olefinically unsaturated monomers being polymerized.

Dispersing agents which can be used in the practice of this invention, are those commonly used in the art such as methyl cellulose, hydroxyethyl cellulose, sodium carboxy-methyl cellulose, starch, gelatin, gum arabic, gum tragacanth, alignates and the like. The concentration of the dispersing agent necessary to effect dispersion of the polymer formed is not narrowly critical and can range from about 1 to 5.0 grams per mole of the water soluble olefinically unsaturated monomer charged although it is preferred to employ a range of about 1.5 to 2.5 grams.

When cross-linking agents are used in the claimed process in order to obtain a copolymer in the form of a gel, it is preferred to use a concentration of about 0.1 to 2.0 mole percent, based on the moles of water soluble olefinically unsaturated monomer being polymerized although ranges above and below these levels can be used if desired. Representative cross-linking agents include bifunctional unsaturated compounds such as alkylene glycol dimethacrylates, as for example, tetraethylene glycol dimethacrylate, pentaethylene glycol dimethacrylate, tetraethylene glycol diacrylate, hexaethylene glycol acrylate, and the like; divinyl substituted aromatics, as for example, divinyl benzene and the like; bisacrylamide and the like and other like bifunctional cross-linking agents. Bisacrylamides are preferred because of their greater water solubility. The amount of cross-linking agent employed will vary from monomer to monomer system and will depend also on the ratio of water soluble to water insoluble monomers used.

Suitable emulsifiers include fatty alcohol esters, such as, lauryl sulfate, myristyl sulfate, octadecyl sulfate, and the like; fatty alcohol ester salts, such as, ammonium, sodium or potassium salts of lauryl sulfate, myristyl sulfate, octadecyl sulfate, and the like; alkali metal salts of fatty acids, such as, sodium oleate, potassium oleate, lithium stearate, sodium palmitate, potassium palmitate, lithium palmitate, and the like; alkylaryl sodium sulfonates, such as, sodium butyl naphthalene sulfonate, sodium octyl naphthalene sulfonate, and the like; alkyl sodium sulfonates containing 13 to 18 carbon atoms, such as, sodium stearyl sulfonate and the like; quaternary ammonium salts, such as, cetyltrimethylammonium chloride, cetylpyridinium chloride, and the like; and polyglycol ethers, such as, Tergitol NP–14 (trademark for a nonionic surfactant, nonylphenol containing 4 moles of ethylene oxide condensed through the phenolic group) polyethylene glycol dimethyl ethers, and the like.

While about 1 to 5 mole percent, based on the moles of hydrocarbon used of emulsifier are satisfactory it is preferred to use about 1 to 3 mole percent.

Although the mechanism of the process is not understood, it is believed that the electrolyte functions in the formulations used in this invention in an unknown manner to repress the swelling of the copolymer formed. This results in the production of a product which is easier to handle or process and also to dry.

An electrolyte is necessary in the practice of this invention where the ratio of water soluble to water insoluble monomer is high because of the tendency of the former to form voluminous polymer gels in an aqueous system. However at lower ratios of water soluble to water insoluble monomer the tendency of the resultant compolymers to gel is eliminated thus obviating the necessity of using electrolytes in the polymerization recipe.

Where an electrolyte is required the amount depends not only upon the particular electrolyte selected but also upon the monomer pair and ratio of said monomer pair used. In general it is preferred to employ about 0.8 to 5 mole percent of electrolyte based on the moles of water soluble monomer charged, although a range of about 1 to 10 mole percent can be used if desired. Exemplary electrolytes which can be used in this invention, all of which must be inert toward the polymerization catalyst, include inorganic acids such as sulfuric acid, phosphoric acid, and the like as well as inorganic salts of these acids such as for example, sodium sulfate, potassium sulfate, ammonium sulfate, potassium phosphate, sodium phosphate, and the like.

Exemplary of normally liquid hydrocarbons used in this invention are the aromatic hydrocarbons such as benzene, toluene, ortho-xylene, meta-xylene, para-xylene, and the like; alicyclic compounds, as for example, cyclopentane, cyclohexane, methylcyclohexane, and the like; and aliphatic hydrocarbons such as n-pentane, n-hexane, isohexane, n-heptane, and the like. The amount of liquid hydrocarbon used can vary from about 55 to 85 mole percent, based on the moles of water insoluble monomer being polymerized, although it is preferred to use about 60 to 80 mole percent. As in the case of the electrolyte the mechanism of operation of the liquid hydrocarbon in this invention is not known but does definitely contribute to the obtainment of a copolymer which is homogeneous as demonstrated by the clarity of the particles. In a specific example where acrylic acid was used as the water soluble monomer and methyl acrylate as the water insoluble monomer when toluene was incorporated into the formulation, a clear product was obtained after neutralization with $NH_4OH$ or an alkali metal hydroxide such as NaOH indicating that no homopolymer of polymethyl acrylate or copolymer fractions rich in long blocks of polymethyl acrylate were formed. In contrast when toluene was omitted from the formulation with all other variables being held constant the copolymer product was opaque.

The swelling index of the clear gels formed with the claimed composition are significantly higher than those obtained with formulations omitting the liquid hydrocarbon. It is desirable to have high swelling indexes, defined as that amount of water imbibed by one gram of dry cross-linked polymer, particularly for end use applications such as fire-fighting compositions and thickening agents.

Conventional polymerization equipment can be used for carrying out these polymerization reactions.

Pressure is not critical and although atmospheric pressures are preferred for economic reasons, superatmospheric as well as subatmospheric pressures can be used if desired.

Polymerization temperatures in the range of about 0° to 80° can be used although it is preferred to use a range of about 5 to 40° C.

Polymerization time is not narrowly critical and if desired times as short as 10 minutes can be used if desired. However, it is preferred to allow polymerization to proceed for at least 20 minutes, there being no upper time limit other than that imposed by practical limitations.

When acrylic or methacrylic acids are used as the water soluble monomers, the resultant copolymer may be readily converted to water-soluble alkali metal salts by neutralization with a base. Thus, for example, the soduim salt may be formed by neutralization with methanolic sodium hydroxide solution or with methanolic sodium methylate.

The uncrosslinked polymers produced by the claimed process can be used in textile sizing for the formation of soluble coatings and as flocculants for mining mill tailings and waster water treatment. The crosslinked copolymers of this invention in salt form may be used as gels is cosmetic and pharmaceutical preparations as well for soil stabilizers and as an ablative gel for fire-fighting.

The invention is further described in the examples which follow. All parts and percentages are by weight unless otherwise specified.

EXAMPLES 1-8

The following charge was added under nitrogen to a 5 liter 4-necked round-bottom flask, fitted with a mechanical stirrer and addition funnel and a nitrogen inlet tube;

| Materials: | Amounts |
|---|---|
| Distilled Water | 480 ml. (27 moles). |
| Methyl Cellulose | 1.6 grams. |
| Sulfuric Acid (98%) | 2.3 grams (0.023 moles). |
| Acrylic Acid | 60 grams (0.84 moles). |
| N,N' - Methylene bisacrylamide | 0.32 grams (0.0022 moles). |
| Duponol ME (30% solution) (Trademark for fatty alcohol sulfate emulsifying agents). | 12 ml. (0.0119 moles). |
| Methyl Acrylate | 23 grams (0.27 moles). |
| Toluene | 69 grams (0.75 moles). |
| $Fe(NH_4)_2(SO_4)_2 \cdot 6H_2O$ | 0.11 grams in 40 ml. of distilled water (0.00028 moles). |

The mixture was cooled in an ice bath and stirred at a speed of about 250 to 300 r.p.m. while a solution of 0.00038 moles of ammonium persulfate (0.088 grams in 40 ml. of distilled water) was added. After the addition, the speed of the stirrer was changed to 400–450 r.p.m. and kept at this speed for 20 minutes. After this time the speed was reduced to 300 r.p.m. The total polymerization time was 1 hour.

The resultant copolymer was filtered through cheese cloth and washed with distilled water three times. The washings and the filtrate were combined and titrated to measure the amount of unreacted acrylic acid using phenolphthalein as an indicator.

The washed polymer was placed in about 800 ml. of methanol. The polymer particles swelled but did not stick to one another. A mixture of methanol and sodium methylate which was equivalent to about 95% of the acrylic acid in the copolymer was added to the methanol suspension of the polymer. Neutralization took place immediately and the sodium salt of the copolymer was isolated as fine granules. The sodium salt of the polymer was washed once with methanol and dried for one hour at 85° C. under reduced pressure. Eight identical runs were carried out in this manner and data such as yield, amount of polymerized acrylic acid, and swelling index entered in the Table showing the reproducibility of this technique.

TABLE

| Example number | Polymerized acrylic acid, g. | Yield, g. | Swelling index |
|---|---|---|---|
| 1 | 53.0 | 85.8 | 1,166 |
| 2 | 53.7 | 88.0 | 1,059 |
| 3 | 53.7 | 86.4 | 1,124 |
| 4 | 53.6 | 87.0 | 1,128 |
| 5 | 51.8 | 81.0 | 1,109 |
| 6 | 52.7 | 84.1 | 1,030 |
| 7 | 52.3 | 85.9 | 1,108 |
| 8 | 53.3 | 81.8 | 1,128 |

Swelling index was determined by immersing 1.00 gram of polymer (salt form) in an excess of distilled water for 16 hours. Free water was removed by filtration. The swelled polymeric gel was weighed and the weight increase is expressed as the polymer's swelling index. It is not a measure of the viscosity of the swollen gel but is commonly used as a measure of the swelling capacity of a microgel.

When viscosities of the polymers were measured, they were determined with Haake Rotovisco Viscometer at 1.6 $Sec^{-1}$ using MV III cup series as defined in "Viscosity and Flow Measurement, A Laboratory Handbook of Rheology"; Table 3–2, Pg. 104 (by J. R. Van Wazer, J. W. Lyons, K. Y. Kim and R. E. Colwell, Interscience Publishers, New York, 1963) with the bob rotating at the lowest r.p.m. setting (U = 162) or 3.6 r.p.m. The same viscosity value would be observed at 1.6 $Sec^{-1}$ shear rate regardless of the instrument used.

The gel strengths or yields values of the polymers were also measured with the Haake Rotovisco Viscometer using the method as shown on P. 80, FIG. 2–11 of the above mentioned textbook. For convenience, the decay of stress is allowed to occur for exactly 300 sec. after a steady state shear stress has been established at 1.6 $Sec^{-1}$. The gel strength of these polymers was about 225 dynes/centimeter$^2$ and the viscosity (Haake at 1.6 $Sec.^{-1}$) was 98,150 centipoises.

The following Controls and Examples were carried out with ¼ of the scale used in Example 1.

CONTROL A

Into a 500 ml. 4-necked round bottom flask, fitted with a mechanical stirrer and addition funnel and a nitrogen inlet tube, the following charge was added under nitrogen:

| Material | Amounts |
|---|---|
| Distilled Water | 60 ml. |
| Methyl Cellulose | 0.4 gram. |
| Sulfuric Acid (0.2N) | 60 ml. |
| Acrylic Acid | 15 gram. |
| N,N'-methylene bisacrylamide | 0.08 gram. |
| Duponol ME (30% solution) | 3 ml. |
| Methyl Acrylate | 6 ml. |
| $Fe(NH_4)_2(SO_4)_2 \cdot 6H_2O$ | 0.028 gram in 10 ml. distilled water. |

The mixture was cooled in an ice bath and stirred at a speed of about 250–300 r.p.m. while a solution of ammonium persulfate (0.022 gram in 10 ml. distilled water) was added. After the addition, the speed of the stirrer was changed to 400–450 r.p.m. and kept at this speed for 20 minutes. After this time the speed was reduced to 300 r.p.m. The total polymerization time was 1 hour.

The polymer was obtained with a particle size larger than those obtained from Examples 1–8. It was cut to smaller pieces, filtered through cheese cloth and washed with distilled water three times. The washings and the filtrate were combined and titrated to measure the amount of unreacted acrylic acid using phenolphthalein as an indicator.

It was shown that 14.1 g. of acrylic acid had been polymerized. The polymer, after conversion to its Nasalt with methanolic-MeONa, weighed 23 g. The gel obtained from the polymeric salt was opaque and the swelling index of the Na-salt was 405.

CONTROL B

Control A was repeated with the exception that 20 ml. of toluene was used but the component Duponol ME was omitted. The polymer formed as a big swollen ball around the stirring rod. The appearance of this polymer resembles that obtained when no methyl acrylate was used. The swollen polymer was cut into small pieces and washed. Titration of the washings showed that 12.7 g. of acrylic acid has been polymerized. The swelling index of the Na-salt of the polymer was 1085 and the yield 19.3 g.

CONTROL C

Control A was repeated with the exception that 20 ml. of toluene was used but the component methyl cellulose was omitted. The polymer was formed as large pieces. It was cut with scissors and washed. Titration showed that 12.7 g. of the acrylic acid had been polymerized. The swelling index of the Na-salt of this polymer was 853. The yield was 20 g.

CONTROL D

The procedure described in Example 1 was followed with the exception that no toluene and Duponol ME were added to the recipe. The titration of the filtrate and the washing showed that the polymer contains the same amount of acrylic acid as in the previous Examples namely about 13.2 grams but the gel obtained from this run was opaque. The swelling index of this copolymer was 522.

CONTROL E

Example 1 was repeated with the exception that 100 ml. of toluene was used instead of 20 ml. The copolymer was obtained as a fine paste which was impossible to filter or wash. It is believed that excess toluene inhibited the copolymerization of methyl acrylate with the acrylic acid.

CONTROL F

Example 1 was repeated with the exception that sulfuric acid was omitted and replaced by 60 ml. of distilled water. The copolymer was obtained as a paste which required a great deal more trouble to filter and wash.

CONTROL G

Example 1 was repeated with the exception that no methyl acrylate was used. The entire polymerization system gelled and no solvent separated out at the end of the polymerization. The gel polymer was cut into small pieces and washed. Titration showed that 15 grams of acrylic acid had been polymerized. Unlike the cross-linked copolymer in Example 1, cut pieces of copolymer stuck together forming a voluminous ball when neutralized with sodium methylate in methanol.

EXAMPLE 9

Example 1 was repeated with the exception that the methylene bisacrylamide cross-linking agent was omitted and the amount of methyl acrylate increased from 6 ml. to 8 ml. The resultant copolymer was obtained as a fine powder which was filtered and washed. One half of the polymer was converted to sodium salt with sodium methylate in methanol and the other half to the ammonium salt by treatment with ammonium hydroxide. Both salts gave clear and viscous solutions in water.

EXAMPLE 10

Example 1 was repeated with the exception that no methylene-biscarylamide cross-linking agent was used and the acrylic acid used was replaced by a mixture of 10 grams of acrylic acid and 5 grams of acrylamide. Titration indicated that the copolymer contained 8.5 grams of acrylic acid copolymerized therein. Sodium salt obtained by neutralization with sodium methylate and methanol afforded a polymer which dissolved to a clear solution in water. A 0.5% solution of the sodium salt of the copolymer exhibited a Brookfield viscosity of 1328 centipoises (No 3 spindle at 60 r.p.m.).

EXAMPLE 11

Example 1 was repeated with the exception that 4.0 ml. of acrylonitrile (3.2 grams) and 30 ml. of toluene were used instead of the 6 ml. of methyl acrylate and 20 ml. of toluene. Titration indicated that the copolymer contained 10.7 grams of acrylic acid copolyymerized therein. Sodium salt obtained by neutralization with sodium methylate afforded a clear gel with a swelling index of 969.

Although the invention has been described in its preferred forms with a certain degree of particularity, it is understood that the present disclosure has been made only by way of example, and that numerous changes can be made without departing from the spirit and scope of the invention.

I claim:
1. Method of preparing homogeneous copolymers of water soluble olefinically unsaturated monomers and water insoluble olefinically unsaturated monomers which comprises:
(A) heating a mixture of
(1) a water soluble olefinically unsaturated monomer having the formula:

$$CH_2=CRR'$$

wherein R is a monovalent radical selected from the group consisting of H or $CH_3$ and R' is a monovalent radical selected from the group consisting of $-CO_2H$, $-CO_2NH_2$, or $$CO_2(CH_2)_nN^+R''R'''R'''',$$

wherein $n$ is an integer having a value of about 1 to about 6 and each R'', R''', and R'''' is a methyl;
(2) about 16 to 50 mole percent, based on the moles of monomer (1), of a water insoluble olefinically unsaturated monomer having the formula:

$$CH_2=CRR_1$$

wherein R is as defined above and $R_1$ is a monovalent radical selected from the group consisting of $-CO_2R_2$, $-OCOCH_3$, halogen, $-CN$, phenyl, or $-OR_2$ wherein $R_2$ is a lower alkyl group having up to 4 carbon atoms;
(3) 0 to about 2.0 mole percent, based on the moles of monomer (1), of a crosslinking agent selected from the group consisting of methylene bisacrylamide, ethylene glycol diacrylates, ethylene glycol dimethacrylates or divinyl benzene;
(4) a polymer dispersing amount of a dispersing agent;
(5) 0 to about 10 mole percent, based on the moles of monomer (1), of an electrolyte;
(6) about 95 to 98 mole percent, based on the moles of monomer (1), of water;
(7) about 55 to 85 mole percent, based on the moles of monomer (2), of a normally liquid hydrocarbon free of olefinic unsaturation and having about 5 to 12 carbon atoms.
(8) about 1.0 to 5.0 mole percent, based on the moles of hydrocarbon (7) of an emulsifier; and
(9) a polymerizing amount of a redox catalyst, at a temperature of about 0° to 80° C. for at least 10 minutes; and
(B) recovering normally solid homogeneous copolymer.
2. The method claimed in claim 1 wherein the water soluble monomer is acrylic acid.
3. The method claimed in claim 1 wherein the water soluble monomer is methacrylic acid.
4. The method claimed in claim 1 wherein the water insoluble monomer is an alkyl acrylate.
5. The method claimed in claim 4 wherein the alkyl acrylate is methyl acrylate.
6. The method claimed in claim 1 wherein the water insoluble monomer is an alkyl methacrylate.
7. The method claimed in claim 6 wherein the alkyl methacrylate is ethyl methacrylate.
8. The method in claim 1 wherein the water insoluble monomer is acrylonitrile.

References Cited
UNITED STATES PATENTS 2,787,610  4/1957  Janssen _____ 260—88.7
3,112,295  11/1963  Marvel _____ 260—85.5

STANFORD M. LEVIN, Primary Examiner

U.S. Cl. X.R.

260—80.3 E, 80.3 N, 80.3 R, 80.76, 80.8, 85.5 P, 86.1 N, 86.1 R, 87.5 R, 88.1 P, 88.1 R; 117—139.5 A; 209—5; 424—78